(12) United States Patent
DeLuca et al.

(10) Patent No.: US 9,299,063 B2
(45) Date of Patent: Mar. 29, 2016

(54) RECEIVER SIDE INDICATION OF PREVIEW CONTENT FOR TEMPLATE EMAILS

(75) Inventors: Lisa Seacat DeLuca, San Francisco, CA (US); Travis M. Grigsby, Austin, TX (US); Trevor Livingston, Austin, TX (US); Ravi Mani, Glenview, IL (US)

(73) Assignee: International Business Machines Corporation, Armonk, NY (US)

( * ) Notice: Subject to any disclaimer, the term of this patent is extended or adjusted under 35 U.S.C. 154(b) by 623 days.

(21) Appl. No.: 13/489,189

(22) Filed: Jun. 5, 2012

(65) Prior Publication Data

US 2013/0326331 A1 Dec. 5, 2013

(51) Int. Cl.
*G06F 3/00* (2006.01)
*G06F 17/00* (2006.01)
*G06Q 10/10* (2012.01)

(52) U.S. Cl.
CPC ..................... *G06Q 10/107* (2013.01)

(58) Field of Classification Search
CPC .......................... G06Q 10/107; G06F 3/04842
USPC .......................... 715/234–236, 200, 255, 752
See application file for complete search history.

(56) References Cited

U.S. PATENT DOCUMENTS

| | | | | |
|---|---|---|---|---|
| 6,114,978 | A * | 9/2000 | Hoag | 341/23 |
| 6,934,778 | B2 * | 8/2005 | Numano | 710/67 |
| 7,120,870 | B1 * | 10/2006 | Nakamura | 715/236 |
| 7,159,188 | B2 | 1/2007 | Stabb et al. | |
| 7,962,557 | B2 | 6/2011 | Lu et al. | |
| 2003/0233419 | A1 * | 12/2003 | Beringer | 709/206 |
| 2010/0076989 | A1 | 3/2010 | Jakobson | |
| 2010/0122213 | A1 * | 5/2010 | Chen | 715/827 |
| 2010/0287507 | A1 * | 11/2010 | Paquette et al. | 715/827 |
| 2011/0264685 | A1 * | 10/2011 | Cheng | 707/769 |
| 2012/0204110 | A1 * | 8/2012 | Cabral | 715/727 |
| 2013/0179814 | A1 * | 7/2013 | Immaneni et al. | 715/769 |

OTHER PUBLICATIONS

Ros Hodgekiss "A practical guide to preheaders" Dec. 15, 2011 https://www.campaignmonitor.com/blog/post/3628/a-practical-guide-to-email-preheaders/.*

Mac Ossowski "Increase Your Email's Impact! Part 1: Preheader" Jul. 14, 2010 http://blog.getresponse.com/increase-your-emails-impact-part-1-preheader.html.*

* cited by examiner

*Primary Examiner* — Manglesh M Patel
(74) *Attorney, Agent, or Firm* — Yee & Associates, P.C.; Maeve McCarthy

(57) ABSTRACT

A computer implemented method, a computer program product, and a data processing system display a user-defined email preview within a mail folder of an email client. A user can enter a user-defined preview text into a preview field associated with a particular email. When a preview of the email is shown in a mail folder, the user-defined preview text is shown as the email preview instead of a truncated portion of the email body.

18 Claims, 6 Drawing Sheets

RECEIVER SIDE INDICATION OF PREVIEW CONTENT FOR TEMPLATE EMAILS

BACKGROUND

1. Field

The disclosure relates generally to a computer implemented method, a computer program product, and a data processing system for sending and receiving email. More specifically, the disclosure relates to a computer implemented method, a computer program product, and a data processing system for displaying email previews within a graphical user interface of an email client.

2. Description of the Related Art

The Internet is a global network of computers and networks joined together by gateways that handle data transfer and the conversion of messages from a protocol of a sending network to a protocol used by a receiving network. On the Internet, any computer may communicate with any other computer. Information between computers travels over the Internet through a variety of languages also referred to as protocols. The set of protocols used on the Internet is called the Transmission Control Protocol/Internet Protocol (TCP/IP).

The Internet has revolutionized communications and commerce as well as being a source of information and entertainment. For many users, e-mail is a widely used format to communicate over the Internet. It is commonplace for users to send e-mail messages to others users through the Internet.

The use of e-mail messages is commonplace for personal and business use. E-mail messages are used by individuals to keep in touch with and communicate with other users. Additionally, e-mail messages provide a medium to collaborate and exchange documents.

E-mail clients often allow a user to preview a particular e-mail within a client inbox or folder without requiring the user to open the email itself. This email preview is displayed in addition to any subject or title that is typically included with the email. The email preview typically includes the first content, or sentence, within the body of the email message. However, because this first content is often a greeting, a preview truncation of the entire email does not alert the user to important information within the email.

SUMMARY

According to one embodiment of the present invention, a computer implemented method, a computer program product, and a data processing system for displaying a user-defined email preview within a mail folder of an email client. A user can enter a user-defined preview text into a preview field associated with a particular email. When a preview of the email is shown in a mail folder, the user-defined preview text is shown as the email preview instead of a truncated portion of the email body.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
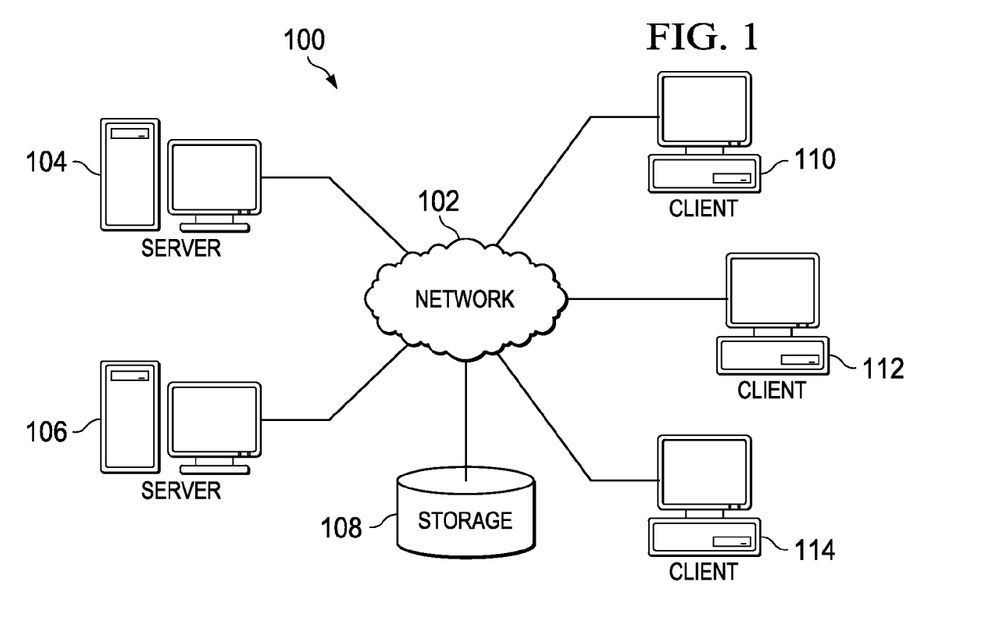
FIG. 1 is illustrative diagram of a data processing environment in which illustrative embodiments may be implemented.

With reference now to the figures and, in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Figure 2:
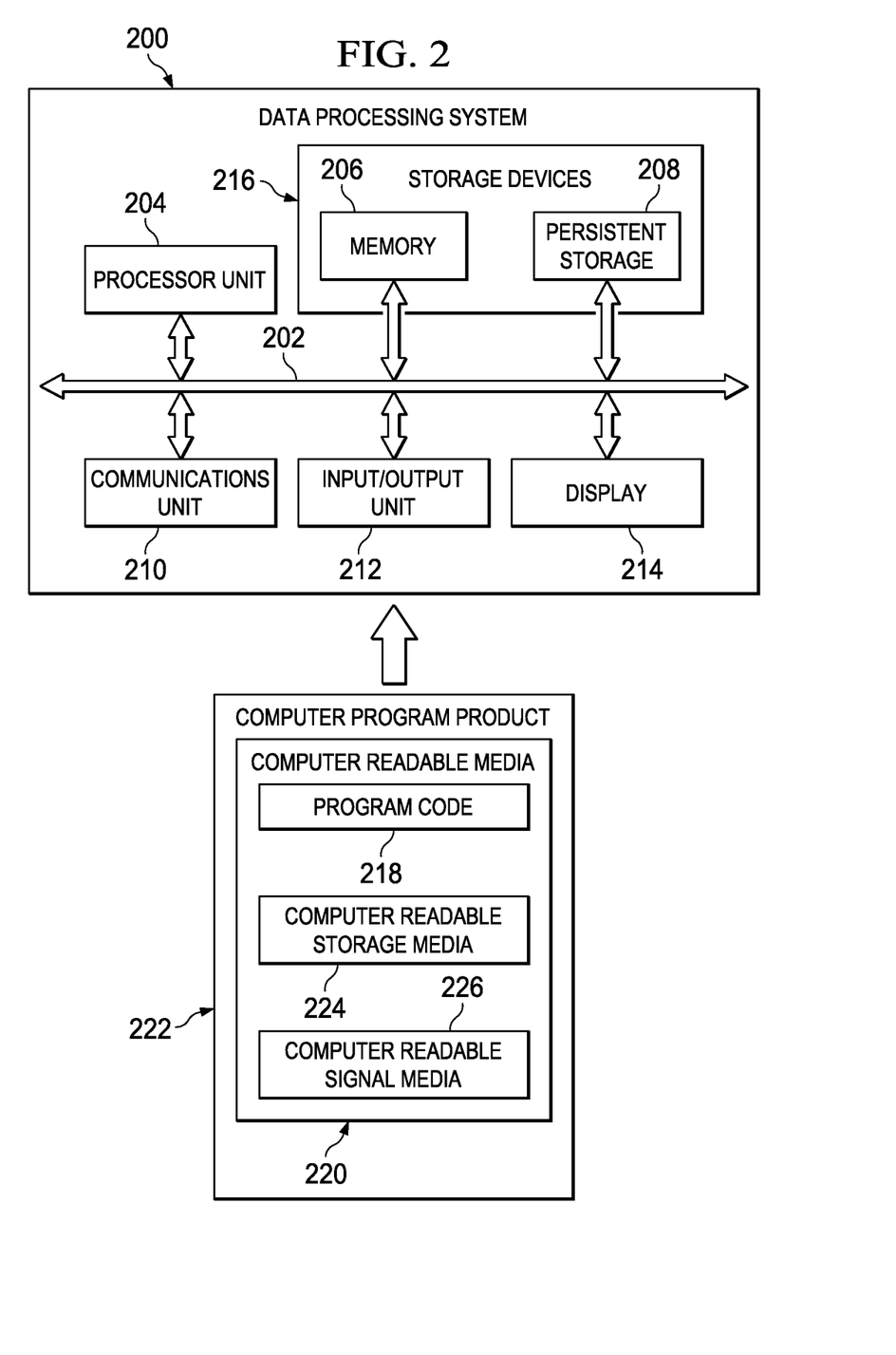
FIG. 2 is an illustration of a data processing system in accordance with an illustrative embodiment.

Turning now to FIG. 2, an illustration of a data processing system is depicted in accordance with an illustrative embodiment. In this illustrative example, data processing system 200 includes communications framework 202, which provides communications between processor unit 204, memory 206, persistent storage 208, communications unit 210, input/output (I/O) unit 212, and display 214. In these examples, communications frame work 204 may be a bus system.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications framework 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these examples, computer readable storage media 224 is a physical or tangible storage device used to store program code 218 rather than a medium that propagates or transmits program code 218. Computer readable storage media 224 is also referred to as a computer readable tangible storage device or a computer readable physical storage device. In other words, computer readable storage media 224 is a media that can be touched by a person.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

In another example, a bus system may be used to implement communications framework 202 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 206, or a cache, such as found in an interface and memory controller hub that may be present in communications framework 202.

Figure 3:
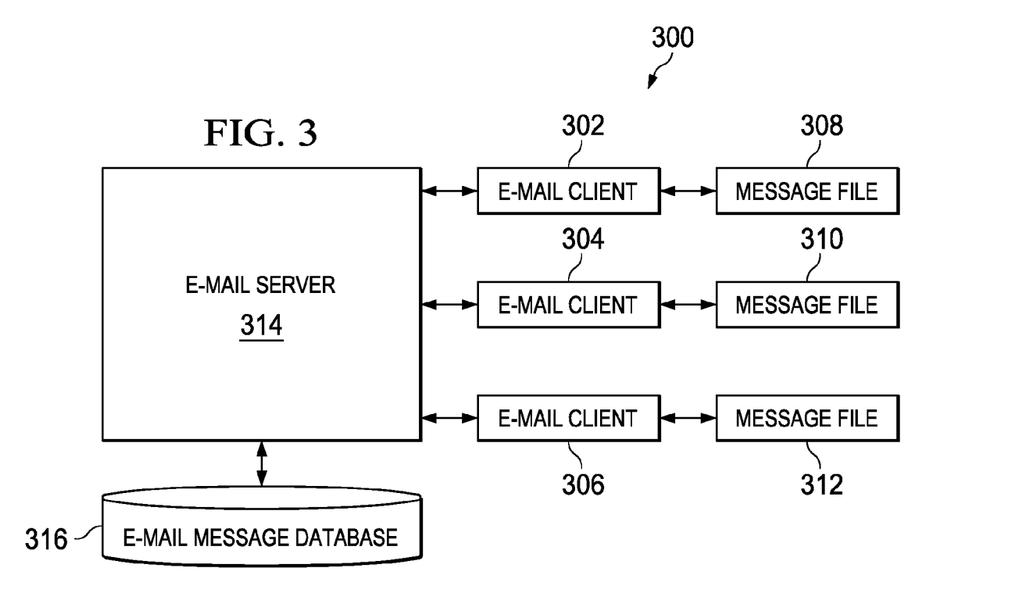
FIG. 3 is a diagram illustrating an e-mail messaging system in accordance with an illustrative embodiment.

Turning now to FIG. 3, a diagram illustrating an e-mail messaging system is depicted in accordance with an illustrative embodiment. In this example, e-mail messaging system 300 includes e-mail client 302, e-mail client 304, and e-mail client 306, which are programs or applications located at different client data processing systems, such as client 110, client 112, and client 114 in FIG. 1. Message file 308, message file 310, and message file 312 are associated with these e-mail clients. These message files store e-mail messages received by the clients and may be organized into various mailboxes. Examples of various mailboxes include, for example, an in folder, a sent folder, a deleted folder, and an outbox folder.

These e-mail programs may employ different protocols depending upon the implementation. For example, simple mail transfer protocol (SMTP) is a standard e-mail protocol that is based on TCP/IP. This protocol defines a message format and the message transfer agent which stores and forwards the mail. Other protocols, such as post office protocol 3 (POP3), also may be employed.

These e-mail programs are used to send e-mails back and forth to different users through e-mail server 314. Messages sent to other e-mail clients are stored in e-mail message database 316. When an e-mail client connects to e-mail server 314, any messages for that particular client are then sent to the client. E-mail clients 302, 304, and 306 may be implemented using presently available e-mail clients.

The illustrative embodiments herein provide a computer implemented method, a computer program product, and a data processing system for displaying a user-defined email preview within a mail folder of an email client. A user can enter a user-defined preview text into a preview field associated with a particular email. When a preview of the email is shown in a mail folder, the user-defined preview text is shown as the email preview instead of a truncated portion of the email body.

Figure 4:
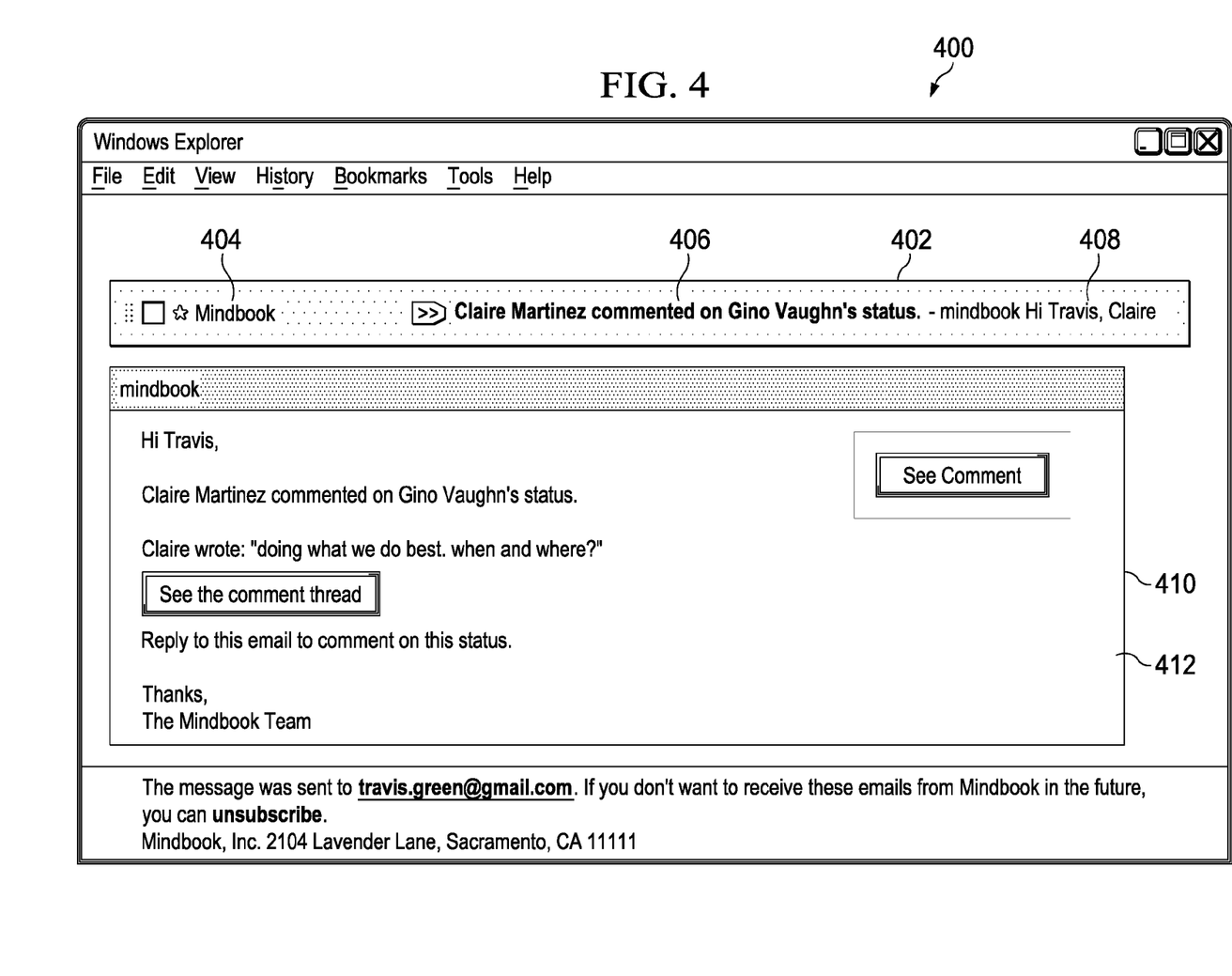
FIG. 4 is an email and email preview according to the prior art.

Referring now to FIG. 4, an email and email preview is shown according to the prior art. Email 400 can be an email sent to an email client, such as one of email clients 302, 304, and 306 of FIG. 3.

Email preview 402 is an email preview that is typically displayed within an "inbox" or other mail folder of an email client's graphical user interface. Email preview 402 includes an identification of sender 404, subject 406, and preview text 408.

Email preview 402 corresponds to email 410. Email 410 is an "open" view of email preview 402. Email 410 includes at least message body 412.

Preview text 408 shows a truncated view of message body 412. Preview text 408 is generally provided to indicate the content of message body 412. However, as can be seen from a comparison of preview text 408 and message body 412, a user viewing preview text 408 is not provided with the pertinent information contained within message body 412.

Figure 5:
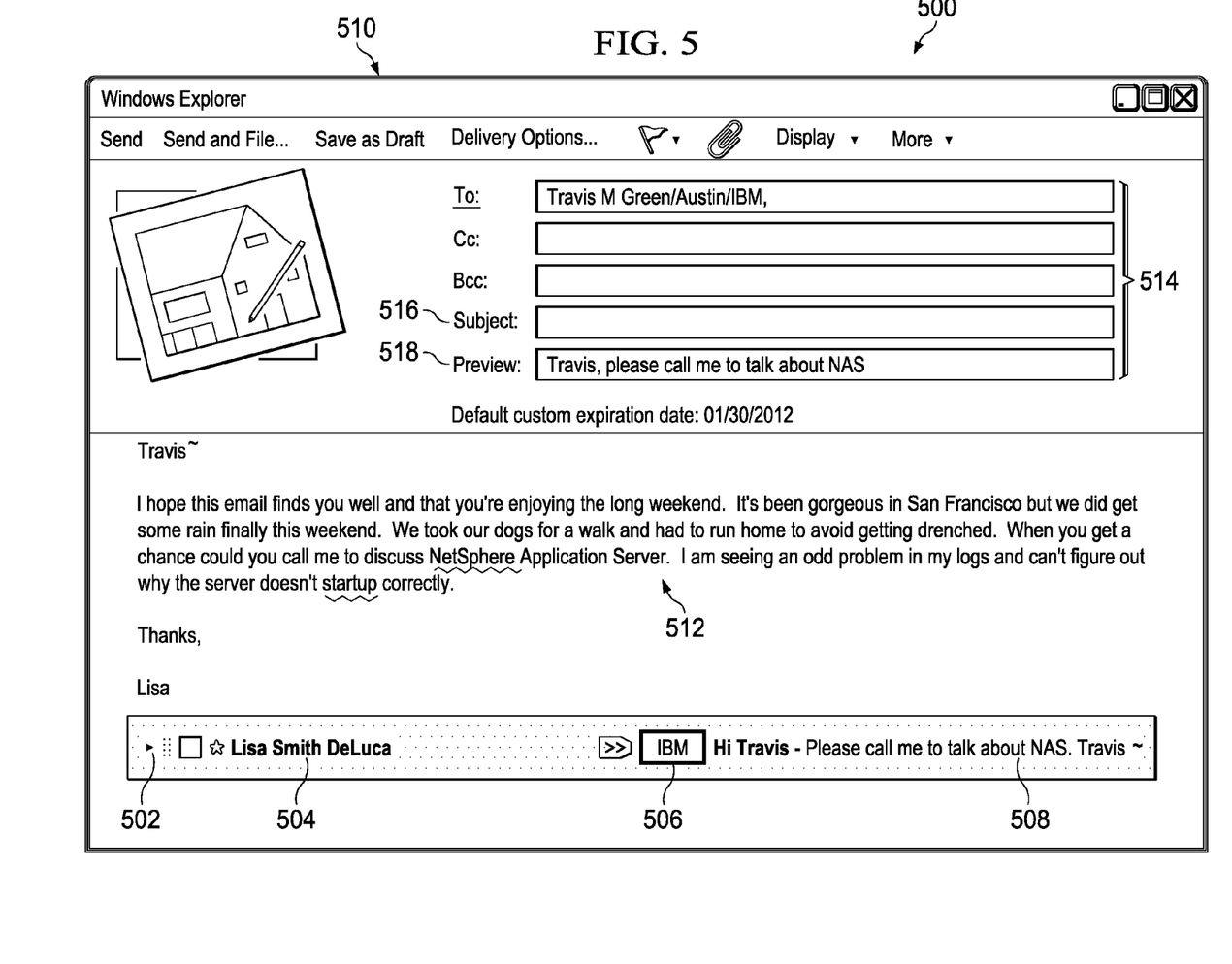
FIG. 5 is a sending-client email and email preview according to an illustrative embodiment.

Referring now to FIG. 5, a sending-client email and email preview is shown according to an illustrative embodiment. Email 500 can be an email sent to an email client, such as one of e-mail clients 302, 304, and 306 of FIG. 3.

Email preview 502 is an email preview that is typically displayed within an "inbox" of an email client's graphical user interface. Email preview 502 includes an identification of sender 504, subject 506, and preview text 508.

Email preview 502 corresponds to email 510. Email 510 is an "open" view of email preview 502. Email 510 includes at least message body 512, and message header 514. Message header 514 includes fields, such as "to:" field, "cc:" field, "bcc:" field, "subject:" field 516, and "preview:" field 518.

Preview field 518 is a sender-defined field that appears as preview text 508 within a mailbox of an email client. A sender can enter a description into preview field that indicates pertinent information regarding content of email body 512. Preview field 518 is in addition to subject field 516 that also appears in message header 514.

Unlike email preview 402 of FIG. 4, preview field 518 does not necessarily correspond to a truncated view of message body 512. Instead, preview text 508 is entered into preview field 518 by the sender to provide the recipient with an indication of the pertinent information within content of message body 512.

Preview field 518 shows one illustrative embodiment for how a sender can enter preview text 508. In one illustrative embodiment, instead of a separate field displayed within the email header, a sender can instead select an option to add preview text from a drop down menu of a graphical user interface. In response to the selection, the sender could then enter the preview text into a text box.

Preview field 518 shows one illustrative embodiment for how a sender can enter preview text 508. In one illustrative embodiment, instead of a separate field displayed within the email header, a sender can instead enter a keyboard shortcut to bring up a text box into which the sender could enter preview text. The keyboard shortcut could be a combination of keystrokes, such as CNTL+P. The sender could then enter the preview text into a text box.

Preview field 518 shows one illustrative embodiment for how a sender can enter preview text 508. In one illustrative embodiment, instead of a separate field displayed within the email header, a sender can instead select or highlight a passage from within email body 512. Upon selecting the highlighted passage, the user can select an option, such as by right-clicking the highlighted passage, to utilize the highlighted passage as a preview text. In response to the selection, the email client would then set the highlighted passage as the preview text.

In one illustrative embodiment, preview text 508 can be stored as metadata within a header of an email file as metadata. When stored as metadata, preview text 508 can exist with other header information, such as routing information. By storing preview text as metadata in the header, the email client can identify and display the preview content separate from the entire message.

In one illustrative embodiment, preview text 508 can be provided as a style within a HyperText Markup Language enabled email. The style can be provided, for example, but not limited to, an in-line style or a Cascading Style Sheet class. By providing preview text as a style within a HyperText Markup Language enabled email instead of, or in addition to providing the preview content in metadata in the header, allows the system to take advantage of additional methods of applying a style. For example, the style within the HyperText Markup Language enabled email could be: <b> This is the preview</p> more info . . . . The bolded style of the style indicates that the content within the tags is to be used for the preview content Referring now to FIG. 6, a receiving-client email and email preview is shown according to an illustrative embodiment. Email 600 can be an email sent to an email client, such as one of e-mail clients 302, 304, and 306 of FIG. 3.

Figure 6:
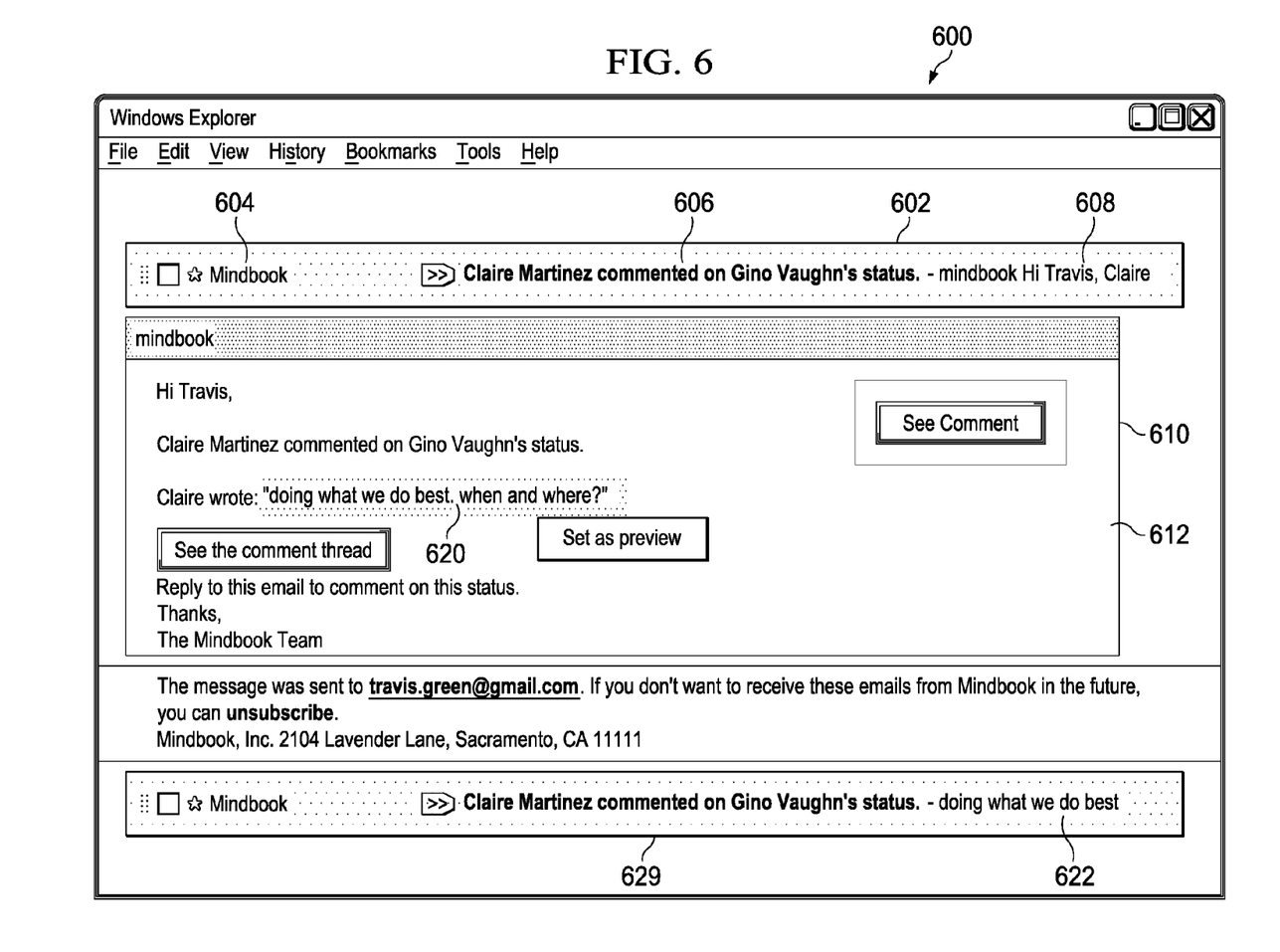
FIG. 6 is receiving-client email and email preview according to an illustrative embodiment.

Email preview 602 is an email preview that is typically displayed within an "inbox" of an email client's graphical user interface. Email preview 602 includes an identification of sender 604, subject 606, and preview text 608.

Email preview 602 is a preview of email 610. Email preview 602 corresponds to an email that was sent from a sender who did not utilize an enhanced email preview, such as email preview 402 of FIG. 4.

Email preview 602 corresponds to email 610. Email 610 is an "open" view of email preview 602. Email 610 includes at least message body 612.

Preview text 608 shows a truncated view of message body 612. Preview text 608 is generally provided to indicate the content of message body 612. However, as can be seen from a comparison of preview text 608 and message body 612, a user viewing preview text 608 is not provided with the pertinent information contained within message body 612.

An email recipient can independently utilize the enhanced preview, regardless of whether the sender utilizes the system. Highlight 620 shows one illustrative embodiment for how a recipient can enter preview text. In one illustrative embodiment, an email recipient can select or highlight a passage from within message body 612 to form highlight 620. Upon selecting the highlighted passage, the user can select an option, such as by right-clicking the highlighted passage, to utilize the highlighted passage as a preview text. In response to the selection, the email client would then change preview text 608 of email preview 602 to preview text 622 of email preview 629. Unlike preview text 608, preview text 622 need not correspond to a truncated view of message body 612. Instead, preview text 622 is selected by the recipient to provide the recipient with an indication of the pertinent information within content of message body 612. The recipient's inbox would then display email preview 602 with preview text 622.

In one illustrative embodiment, preview text 622 can display a predetermined number of characters. In one illustrative embodiment, if preview text 622 is less than the predetermined number of characters allowed within preview text 622, then preview text 622 can also display information from message body 612 in addition to preview text 622. In one illustrative embodiment, if preview text 622 exceeds the predetermined number of characters allowed within preview text 622, then preview text 622 can display a truncated amount of preview text 622. The entirety of preview text 622 could be viewable upon a "mouse-over" or "hover" on preview text 622.

In one illustrative embodiment, instead of selecting the highlighted passage directly from message body 612, a recipient can enter preview text 622 directly into a separate field displayed within the email header. A sender can enter a description into a preview field that indicates pertinent information regarding content of message body 612. The preview field is in addition to the subject field that also appears in the email header. The recipient's inbox would then display email preview 602 with preview text 622.

In one illustrative embodiment, instead of selecting the highlighted passage directly from the message body, a recipient can instead select an option to add preview text from a drop down menu of a graphical user interface. In response to the selection, the recipient could then enter the preview text into a text box. The recipient's inbox would then display email preview 602 with preview text 622.

In one illustrative embodiment, instead of selecting the highlighted passage directly from the message body, a recipient can instead enter a keyboard shortcut to bring up a text box into which the sender could enter preview text. The keyboard shortcut could be a combination of keystrokes, such as CNTL+P. The sender could then enter the preview text into a text box. The recipient's inbox would then display email preview 602 with preview text 622.

Figure 7:
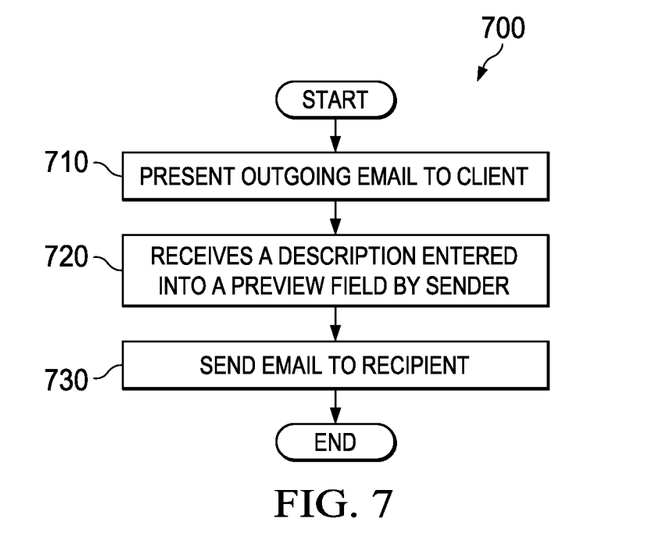
FIG. 7 is a flowchart of a process for designating a preview text within preview field of an outgoing email message according to an illustrative embodiment.

Referring now to FIG. 7, a flowchart is shown for designating a preview text within preview field of an outgoing email message. Process 700 is a software process, executing on a software component, such as one of email clients 302, 304, and 306 of FIG. 3.

Process 700 begins by presenting an outgoing email to the client (step 710). The outgoing email is an email such as email 500 of FIG. 5. The email includes a preview field, such as preview field 518 of FIG. 5.

Process 700 receives a description entered into a preview field by a sender (step 720). The preview field can be preview field 518 of FIG. 5. The preview field is a sender-defined field that appears as preview text 508 within a mailbox of an email client. A sender can enter a description into the preview field that indicates pertinent information regarding content of an email body. The preview field is in addition to a subject field.

Process 700 then sends the email to a recipient (step 730), with the process terminating thereafter. The description entered into the preview field by the sender is displayed by the recipients' email client as preview text. The preview text can be preview text 508 of FIG. 5.

Figure 8:
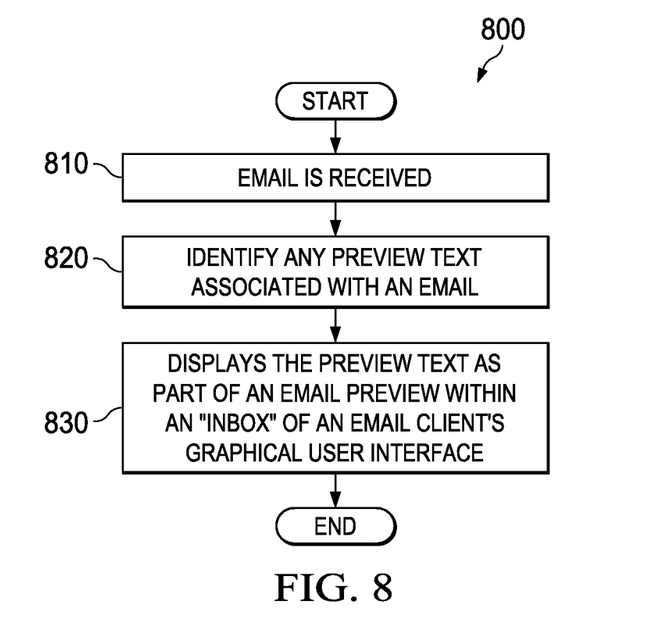
FIG. 8 is a flowchart of a process for displaying a preview text at a receiving email client according to an illustrative embodiment.

Referring now to FIG. 8, a process for displaying a preview text at a receiving email client is shown according to an illustrative embodiment. Process 800 is a software process, executing on a software component, such as one of email clients 302, 304, and 306 of FIG. 3.

Process 800 begins when an email is received (step 810). The email can be email 600 of FIG. 6.

Responsive to receiving the email, process 800 identifies any preview text associated with the email (step 820). The preview text can be preview text 622 of FIG. 6. In one illustrative embodiment, the preview text is identified from metadata stored within a header of an email file. When stored as metadata, the preview text can exist with other header information, such as routing information.

Responsive to identifying preview text associated with the email, process 800 displays the preview text as part of an email preview within an "inbox" of an email client's graphical user interface (step 830), with the process terminating thereafter. The email preview can be email preview 602 of FIG. 6. In addition to the preview text, the email preview includes at least an identification of a sender and a subject.

Thus, the illustrative embodiments herein provide a computer implemented method, a computer program product, and a data processing system for displaying a user-defined email preview within a mail folder of an email client. A user can enter a user-defined preview text into a preview field associated with a particular email. When a preview of the email is shown in a mail folder, the user-defined preview text is shown as the email preview instead of a truncated portion of the email body.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for displaying an email preview of an email within a mail folder of an email client, the computer implemented method comprising:
   a computer presenting the email within a graphical user interface of the email client;
   the computer receiving user-defined preview text by a user highlighting a passage within a body of the email and selecting an option to utilize the highlighted passage within the body of the email as the user-defined preview text;
   the computer automatically applying a predefined in-line preview style to the user-defined preview text; and
   the computer displaying the user-defined preview text in the predefined in-line preview style as the email preview of the email within the graphical user interface of the email client, wherein the email preview is displayed in addition to an email subject of the email.

2. The computer implemented method of claim 1, wherein the email is an outgoing email.

3. The computer implemented method of claim 2, further comprising:
   the computer storing the user-defined preview text as metadata within a header of the outgoing email.

4. The computer implemented method of claim 3, further comprising:
   the computer providing the user-defined preview text as a style within a Hypertext Markup Language enabled email.

5. The computer implemented method of claim 1, further comprising:
   the computer identifying user-defined preview text as metadata within a header of an incoming email.

6. The computer implemented method of claim 5 further comprising:
   the computer determining whether the user-defined preview text of the incoming email exceeds a number of allowed characters; and
   responsive to determining that the user-defined preview text of the incoming email exceeds the number of allowed characters, the computer displaying a truncated amount of the user-defined preview text, and responsive to a mouse-over of the truncated amount, displaying an entirety of the user-defined preview text; and
   responsive to determining that the user-defined preview text of the incoming email does not exceed the number of allowed characters, the computer displaying a truncated of portion of a message body of the incoming email in addition to the user-defined preview text.

7. A computer program product for displaying an email preview of an email within a mail folder of an email client, the computer program product comprising:
   one or more computer-readable, tangible storage media;
   program instructions, stored on at least one of the one or more storage media, to present the email within a graphical user interface of the email client;
   program instructions, stored on at least one of the one or more storage media, to receive user-defined preview text by a user highlighting a passage within a body of the email and selecting an option to utilize the highlighted passage within the body of the email as the user-defined preview text;
   program instructions, stored on at least one of the one or more storage media, to automatically apply a predefined in-line preview style to the user-defined preview text; and
   program instructions, stored on at least one of the one or more storage media, to display the user-defined preview text in the predefined in-line preview style as the email preview of the email within the graphical user interface of the email client, wherein the email preview is displayed in addition to an email subject of the email.

8. The computer program product of claim 7, wherein the email is an outgoing email.

9. The computer program product of claim 8, further comprising:
   program instructions, stored on at least one of the one or more storage media, to store the user-defined preview text as metadata within a header of the outgoing email.

10. The computer program product of claim 9, further comprising:
    program instructions, stored on at least one of the one or more storage media, to provide the user-defined preview text as a style within a Hypertext Markup Language enabled email.

11. The computer program product of claim 7, further comprising:
    program instructions, stored on at least one of the one or more storage media, to identify user-defined preview text as metadata within a header of an incoming email.

12. The computer program product of claim 11 further comprising:
    program instructions, stored on at least one of the one or more storage media, determining whether the user-defined preview text of the incoming email exceeds a number of allowed characters; and
    program instructions, stored on at least one of the one or more storage media, responsive to determining that the user-defined preview text of the incoming email exceeds the number of allowed characters, to display a truncated amount of the user-defined preview text, and responsive to a mouse-over of the truncated amount, displaying an entirety of the user-defined preview text; and
    program instructions, stored on at least one of the one or more storage media, responsive to determining that the user-defined preview text of the incoming email does not exceed the number of allowed characters, to display a truncated of portion of a message body of the incoming email in addition to the user-defined preview text.

13. A computer system for displaying an email preview of an email within a mail folder of an email client, the computer system comprising:
    one or more processors, one or more computer-readable memories and one or more computer-readable, tangible storage media;

program instructions, stored on at least one of the one or more storage media for execution by at least one of the one or more processors via at least one of the one or more memories, to present the email within a graphical user interface of the email client;

program instructions, stored on at least one of the one or more storage media for execution by at least one of the one or more processors via at least one of the one or more memories, to receive user-defined preview text by a user highlighting a passage within a body of the email and selecting an option to utilize the highlighted passage within the body of the email as the user-defined preview text;

program instructions, stored on at least one of the one or more storage media for execution by at least one of the one or more processors via at least one of the one or more memories, to automatically apply a predefined in-line preview style to the user-defined preview text; and program instructions, stored on at least one of the one or more storage media for execution by at least one of the one or more processors via at least one of the one or more memories, to display the user-defined preview text in the predefined in-line preview style as the email preview of the email within the graphical user interface of the email client, wherein the email preview is displayed in addition to an email subject of the email.

14. The computer system of claim 13, wherein the email is an outgoing email.

15. The computer system of claim 14, further comprising:
program instructions, stored on at least one of the one or more storage media for execution by at least one of the one or more processors via at least one of the one or more memories, to store the user-defined preview text as metadata within a header of the outgoing email.

16. The computer system of claim 15, further comprising:
program instructions, stored on at least one of the one or more storage media for execution by at least one of the one or more processors via at least one of the one or more memories, to provide the user-defined preview text as a style within a Hypertext Markup Language enabled email.

17. The computer system of claim 13, further comprising:
program instructions, stored on at least one of the one or more storage media for execution by at least one of the one or more processors via at least one of the one or more memories, to identify user-defined preview text as metadata within a header of an incoming email.

18. The computer system of claim 17 further comprising:
program instructions, stored on at least one of the one or more storage media for execution by at least one of the one or more processors via at least one of the one or more memories, to determine whether the user-defined preview text of the incoming email exceeds a number of allowed characters; and program instructions, stored on at least one of the one or more storage media for execution by at least one of the one or more processors via at least one of the one or more memories, responsive to determining that the user-defined preview text of the incoming email exceeds the number of allowed characters, to display a truncated amount of the user-defined preview text, and program instructions, stored on at least one of the one or more storage media for execution by at least one of the one or more processors via at least one of the one or more memories, responsive to a mouse-over of the truncated amount, to display an entirety of the user-defined preview text; and program instructions, stored on at least one of the one or more storage media for execution by at least one of the one or more processors via at least one of the one or more memories, responsive to determining that the user-defined preview text of the incoming email does not exceed the number of allowed characters, to display a truncated of portion of a message body of the incoming email in addition to the user-defined preview text.

* * * * *